US 6,583,216 B1

(12) United States Patent
König et al.

(10) Patent No.: US 6,583,216 B1
(45) Date of Patent: Jun. 24, 2003

(54) MALONIC ESTER-BLOCKED HDI TRIMER WITH IPDA STABILIZATION AND FORMALDEHYDE STABILIZATION

(75) Inventors: Eberhard König, Leverkusen (DE); Claus Kobusch, Shanghai (CN); Uwe Klippert, Burscheid (DE); Wolfram Küttner, Bergisch Gladbach (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/070,028

(22) PCT Filed: Aug. 21, 2000

(86) PCT No.: PCT/EP00/08122

§ 371 (c)(1),
(2), (4) Date: Jun. 3, 2002

(87) PCT Pub. No.: WO01/16202

PCT Pub. Date: Mar. 8, 2001

(30) Foreign Application Priority Data

Aug. 30, 1999  (DE) .......................................... 199 41 213

(51) Int. Cl.$^7$ ....................... C09D 175/04; C08L 75/04; C08J 3/03; C08J 3/02; C08G 18/80
(52) U.S. Cl. ............... 524/591; 252/182.2; 252/182.21; 524/839; 528/45; 528/67; 560/125; 560/170; 564/32; 564/57; 564/123; 564/192
(58) Field of Search .......................... 252/182.2, 182.21; 524/591, 839; 528/45, 67; 560/125, 170; 564/32, 57, 123, 192

(56) References Cited

U.S. PATENT DOCUMENTS

| 4,324,716 | A | * | 4/1982 | Reischl et al. ............... 524/761 |
| 4,727,100 | A | * | 2/1988 | Vasta ........................... 524/40 |
| 4,734,520 | A | * | 3/1988 | Plum et al. .................. 560/115 |
| 5,071,937 | A | * | 12/1991 | Potter et al. ................... 528/45 |
| 5,126,424 | A | * | 6/1992 | Brindopke et al. ........... 528/45 |
| 6,060,573 | A | * | 5/2000 | Konig et al. ................... 528/45 |
| 6,242,530 | B1 | | 6/2001 | König et al. ................. 524/718 |

FOREIGN PATENT DOCUMENTS

| DE | 198 13 252 | 9/1999 |
| DE | 198 56 968 | 6/2000 |
| EP | 208 867 | 1/1987 |
| EP | 313 932 | 5/1989 |
| EP | 319 608 | 6/1989 |

* cited by examiner

Primary Examiner—Rabon Sergent
(74) Attorney, Agent, or Firm—Joseph C. Gil; Thomas W. Roy

(57) ABSTRACT

The present invention relates to blocked polyisocyanate cross-linking agents and their use in one-component stoving lacquers, in particular in solvent-containing or predominantly water-based plastics coatings having a soft-feel effect.

3 Claims, No Drawings

MALONIC ESTER-BLOCKED HDI TRIMER WITH IPDA STABILIZATION AND FORMALDEHYDE STABILIZATION

BACKGROUND OF THE INVENTION

The present invention relates to blocked polyisocyanate cross-linking agents and their use in one-component stoving lacquers, in particular in solvent-containing or predominantly water-based plastics coatings having a soft-feel effect.

The use of CH-acid esters as isocyanate blocking agents is prior art; cf. the work reported by S. Petersen in Liebigs Ann. Chem. 562 (1949) page 205 et seq. An advantage of these blocking agents, for example, diethyl malonate or ethyl acetoacetate, is the low stoving range of 80° C. to 120° C. for producing the coatings. Moreover, unlike other blocking agents, they produce no harmful substances.

Disadvantages of these blocking agents are firstly the increased tendency of the coatings to yellow during the stoving process and secondly the tendency of the blocked polyisocyanate cross-linking agents to crystallise. For example, a polyisocyanate based on 1,6-diisocyanatohexane (HDI) and blocked with diethyl malonate, despite a considerable quantity of solvent, solidifies after a few days to form a glass-like composition, which can, however, be carefully melted again.

Accordingly, methods of averting these disadvantages have also been published in the patent literature. In DE-A 19 748 587 it is proposed that, instead of exclusively diethyl malonate, a mixture of diethyl/diisopropyl malonate be used for the blocking. In this way the tendency to crystallise is counteracted.

DE-A 19 813 352 describes the incorporation of formaldehyde for the same purpose. Furthermore, the incorporated formaldehyde as well as the content of certain hydrazides and HALS amines prevent the development of a distinct thermal yellowing of the stoving lacquer. It has been found, however, that in the case of certain polyisocyanates the method of DE-A 19 813 352 is inadequate to prevent opacity and precipitation (see comparison examples 2 and 3).

The object of the invention is to prepare polyisocyanate cross-linking agents blocked with CH-acid esters in such a way as to ensure that the cross-linking agents are stable in storage and that as little thermal yellowing as possible occurs in the coatings. This object was achievable with the blocked polyisocyanate cross-linking agents according to the invention.

SUMMARY OF THE INVENTION

The invention provides blocked polyisocyanate cross-linking agents which are dissolved in a solvent (mixture) and have a content of blocked isocyanate groups of from 5 to 20%, preferably 8 to 14%, and contain

| | |
|---|---|
| 100 equivalent. % | NCO groups of an aliphatic and/or cycloaliphatic polyisocyanate, |
| 80–95 equivalent. % | of a CH-acid ester blocking agent, |
| 5–20 equivalent. % | of NH$_2$ groups of an aliphatic/cycloaliphatic diamine and |
| 5–50 mol. % | of formaldehyde in incorporated form. |

The invention finally also provides the use of the blocked polyisocyanate cross-linking agents according to the invention for curing organic polyhydroxyl compounds in polyurethane stoving lacquers in solvent-containing phase or in aqueous phase. These are used, for example, in automobiles, for plastics coatings having a soft-feel effect.

DETAILED DESCRIPTION OF THE INVENTION

Besides the above-mentioned components which are essential to the invention, the blocked polyisocyanate cross-linking agents according to the invention may also contain hydrazides and HALS amines as additives which provide resistance to thermal yellowing, as described in EP-A 829 500 or DE-A 19 856 968.

In addition, the blocked polyisocyanate cross-linking agents according to the invention further contain 5 to 50 wt. %, preferably 15 to 30 wt. %, of solvents. Solvents which exhibit a tendency to be miscible in water are preferred, such as, for example, 1-methoxy-2-propyl acetate, isobutanol, butyl glycol, N-methylpyrrolidone, butyl diglycol or butyl diglycol acetate.

The blocked polyisocyanate cross-linking agents according to the invention are non-crystallising, clear products which are stable in storage curing components which react with themselves and also with OH components at 80° C. to 120° C.

coreactants for both solvent-based and water-based OH components.

The polyisocyanate cross-linking agents according to the invention may be prepared as follows:

The polyisocyanate component, optionally with a little solvent, for example, 1-methoxy-2-propyl acetate (MPA), is initially introduced at approximately 50° C.; the CH-acid ester, for example, malonic ester, is added thereto as a mixture with approximately 2 to 3% of a 30% Na methylate solution and the reaction is allowed to proceed at 60° C. to 90° C. until the calculated NCO content has been attained. Then the calculated quantity of diamine, for example, 1-amino-3,3,5-trimethyl-5-aminomethylcyclohexane (IPDA), dissolved in additional MPA, is added thereto and the reaction continued at approximately 50° C. to 70° C., so that NCO groups are no longer detectable. Thereafter, at 40° C. to 50° C., the clear solution of paraformaldehyde and about 10%, based on paraformaldehyde, of a 30% Na methylate solution as base and isobutanol are added to the batch, which is then stirred for 1 to 2 hours at 40° C. to 50° C., as a result of which the formaldehyde is chemically bound (the incorporated form). The detectable amounts of free formaldehyde are only less than 0.1%. For the special embodiment of the cross-linking agents according to the invention, in particular for light-coloured coatings, at this stage of the batch the stabilisers which provide resistance to thermal yellowing, for example, the above-mentioned addition product of 2 mol propylene carbonate and 1 mol hydrazine, and the HALS amine Tinuvin 770 DF® (Ciba Speciality) can be stirred in. In order to adjust the required viscosity to within a range of <10000 mPas, the batch is diluted with further alcohol, for example, isobutanol and/or butyl glycol, and finally made slightly acid (pH 5.0–6.9) with 0.5 to 2.5%, based on the batch, of dibutyl phosphate.

The polyisocyanates constituting the blocked polyisocyanate cross-linking agents according to the invention are known coating polyisocyanates having aliphatically and/or cycloaliphatically bonded isocyanate groups and an isocyanate content of 7 to 30 wt. %, preferably 12 to 25 wt. %.

Polyisocyanates preferably used are known per se coating polyisocyanates based on 1,6-diisocyanatohexane (HDI), 1-isocyanato-3,3,5-trimethyl-5-isocyanatomethylcyclohexane (IPDI) and/or bis(4-isocyanatocyclohexyl)methane ($H_{12}MDI$ or Desmodur W®/Bayer AG) having biuret, isocyanurate, urethane, allophanate and/or uretdione groups. The asymmetrically trimerised (that is, in addition to isocyanurate also having iminooxadiazindione groups) coating polyisocyanates based on 1,6-diisocyanatohexane, of the type described, for example, in EP-A 798 299, can also be used as polyisocyanate components.

Polyisocyanates based on other isocyanates can also be used, such as, for example, diisocyanatobutane-1,4,2,4- or 2,6-diisocyanato-1-methylcyclohexane, 2,5- and/or 2,6-bis(isocyanato)norbornane, 3- and/or 4-isocyanatomethyl-1-methyl-cyclohexane, 1,4-bis(2-isocyanatoprop-2-yl)benzene, 1,3-diisocyanatomethylbenzene, 1,3- or 1,4-bis(isocyanatomethyl)cyclohexane.

The most preferred polyisocyanate components are polyisocyanates based on 1-6 diisocyanatohexane which contain isocyanurate groups.

Suitable blocking agents are CH-acid esters, for example, diethyl malonate or ethyl acetoacetate and/or their methyl, isopropyl, isobutyl or tertiary butyl derivatives. Diethyl malonate is preferred.

The diamine component incorporated in the cross-linking agents according to the invention has the task of reacting mildly with the NCO groups still remaining after the NCO-blocking reaction and thereby contributing to the enlargement of the molecules. In this way 5 to 20 equivalent. %, preferably 7 to 10 equivalent. %, of NCO groups are reacted by diamine extension and a possible tendency to crystallise is prevented. Aliphatic and cycloaliphatic diamines are suitable. Examples which may be mentioned are ethylenediamine and propylenediamine, 4,4'-diaminodicyclohexylmethane and 1,4-diaminocyclohexane 3,3,5-trimethyl-5-aminomethylcyclohexylamine (IPDA) is preferred.

As a result of the incorporation of formaldehyde into the cross-linking agents according to the invention, firstly the tendency to crystallise, in particular that of blocked polyisocyanates based on HDI, is distinctly lessened, as is also the thermal yellowing of the stoving lacquers.

Per 100 equivalent. % of blocked and diamine-extended polyisocyanate, preferably 0.1 to 0.4 mol, i.e. 10 to 40 equivalent. %, of paraformaldehyde is added and reacted with a base, for example, Na methylate. This amounts to 0.5 to 5.0 wt. % formaldehyde, based on the cross-linking agents according to the invention without the solvent content.

The stabilisers disclosed in EP-A 0 829 500 can be used as additional stabilising components. Preferred stabilisers according to the invention are the incorporable hydrazide corresponding to formula (Ia)

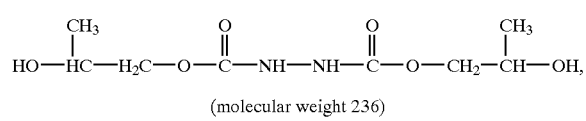

(Ia)

(molecular weight 236)

which is easily attainable by addition of hydrazine hydrate to 2 mol propylene carbonate, and the HALS amine Tinuvin 770 DF® which is unsubstituted at the N atom (Ciba Speciality).

Preferably 3 to 6 wt. % of the hydrazide stabiliser and preferably 0.5 to 1.5 wt. % of the formadehyde stabiliser, each based on the cross-linking agents according to the invention without the solvent content, are used here.

The solvents or solvent mixtures used can be the solvents known per se from polyurethane chemistry which are not reactive with NCO groups. Examples are 1-methoxy-2-propyl acetate, solvent naphtha 100 or butyl acetate as well as N-methylpyrrolidone and butyl diglycol acetate. If the NCO groups are blocked, then preferably alcohols are used, for example, butanols such as isobutanol or butyl glycol, in order to render possible a transesterification with the alcohol groups of the blocking agent. If the polyisocyanate cross-linking agent according to the invention is used in conjunction with aqueous OH components for the production of water-based binder compositions, it additionally contains 5 to 20% by weight, based on the polyisocyanate cross-linking agent solution, of N-methylpyrrolidone.

The polyisocyanate cross-linking agents according to the invention exhibit satisfactory stability in storage, that is, no crystallisation, little thermal yellowing and good coating properties.

The coating films obtainable with the cross-linking agents according to the invention exhibit permanently stable soft-feel surfaces with good adhesion to the substrate (haptic qualities). They are therefore suitably mainly for the coating and lacquering of plastics surfaces.

EXAMPLES

Example 1

According to the Invention

The blocked polyisocyanate cross-linking agent described here had an IPDA content of 2.32 wt. % and a formaldehyde content of 2.46 wt. %, based on solids.

| Ingredients | | |
|---|---|---|
| 196.0 g | (1.0 g equiv.) | of an isocyanurate-containing coating polyisocyanate based on 1,6-diisocyanatohexane (HDI) having an NCO content of 21.4 wt. %, viscosity at 23° C. approx. 3000 mPas |
| 152.0 g | (0.95 mol) | Diethyl malonate |
| 3.0 g | | Na methylate solution, 30% in methanol |
| 8.5 g | (0.10 g equiv.) | 3,3,5-Trimethyl-5-aminomethylcyclohexylamine (IPDA) |
| 9.0 g | (0.30 mol) | Paraformaldehyde |
| 0.9 g | | Na methylate solution, 30% in methanol |
| 40.6 g | | N-methylpyrrolidone (NMP) |
| 40.6 g | | Isobutanol (IB) |
| 40.6 g | | Butyl glycol (BG) |
| 4.8 g | | Dibutyl phosphate |
| 496.0 g | (0.95 g equiv.) | Blocked NCO groups |
| | | Solids content: 75 wt. % |
| | | Blocked-NCO content: 8.0 wt. % |
| | | Viscosity at 23° C.: approx. 7200 mPas |
| | | Hazen colour index: <100 |
| | | NCO equivalent: 525 g |

Procedure

The polyisocyanate was placed in a flask at approx. 50° C. The mixture of malonic ester and Na methylate solution was added thereto in relatively large portions, with stirring. On conclusion of the addition, stirring was continued for 2 to 3 hours, until an NCO content of 0.6 to 0.8% was ascertained; the calculated NCO content was 0.6%. The solution of IPDA and NMP was added and the mixture was then stirred for 30 minutes at 60° C., until an NCO content was no longer detectable. The mixture was diluted with BG and the clear solution of paraformaldehyde, Na methylate solution and IB were added thereto and stirring was continued for approx. 3 hours at 50° C. The mixture was then cooled, acidified with dibutyl phosphate and stored. A clear solution of a blocked polyisocyanate cross-linking agent, which was stable in storage for months and had the properties given for the batch, was obtained.

Example 2

Comparison Example

The cross-linking agent was again prepared as in Example 1, with the following modification: 0.1 g equiv. IPDA was omitted and replaced by malonic ester. This cross-linking agent became opaque after storage for 7 days at room temperature, but remained liquid.

Example 3

Comparison Example

The cross-linking agent was again prepared as in Example 2, with the following modification: the incorporation of formaldehyde was omitted. Compared with the cross-linking agent from Example 1, IPDA and formaldehyde were therefore absent.

After storage for 3 days at room temperature, this cross-linking agent solidified to form a glass-like, clear composition.

Example 4

According to the Invention

This Example describes the use of the cross-linking agent from Example 1 in an aqueous soft-feel coating produced in one-component form. Here it was surprising that the very reactive and solvent-containing type of cross-linking agent in Example 1 could be mixed homogeneously with the resin components, which were dispersed predominantly in water. It was also surprising that these coating batches were stable and workable for at least 2 weeks, which is highly unusual for aqueous isocyanates blocked with malonic ester.

| Coating ingredients | Parts by wt. |
|---|---|
| Bayhydrol ® VP LS 2244/1 (Bayer AG, OH-polyester resin 80% in NMP), OH content of the supplied material 1.44%, 1 OH equivalent = 1180 g) | 50.0 |
| Bayhydrol ® PR 240 (Bayer AG, nonfunctional PU dispersion, 40% in water) | 100.0 |
| Defoaming agent DNE, supplied material (K. Obermayer, Bad Berleburg) | 0.6 |
| Tego Wet ® KL 245, 50% in water (Tegochemie, Essen) | 1.1 |
| Aquacer ® 535, supplied material (Byk Chemie, Wesel) | 4.5 |
| Byk 348, supplied material) (Byk Chemie, Wesel) | 1.5 |
| Sillitin ® Z 86 (Hoffmann & Söhne, Neuburg) | 10.6 |
| Pergopak ® M3 Martinswerk, Bergheim) | 15.8 |
| Talc IT Extra (Norwegian Talc, Frankfurt) | 5.3 |
| Bayferrox ® 318M | 42.3 |
| Flatting agent OK 412 (Degussa, Frankfurt) | 5.3 |
| Distilled water | 71.5 |
| Total | 398.5 |
| Cross-linking agent in Example 1 (NCO/OH ratio 1.5) | 34.3 |
| Aqueous effect lacquer | 342.8 |

This coating was sprayed through a 1.4 mm nozzle, at an air pressure of 3 bar, onto plastics tiles (Bayblend T 65 MN) and dried for 45 minutes at 80° C. and for 45 minutes at 100° C.

Assessment of Coating

The stoved (80° C. to 100° C.) black matt coating had a pleasant feel (special haptic qualities), a rubber-like effect, when it was rubbed.

The pendulum hardness, resistance to solvents and the Crockmeter test gave good values, comparable with those of a two-component system containing an unblocked polyisocyanate dispersed in water.

Example 5

According to the Invention

This cross-linking agent had a composition corresponding to that given in Example 1. But in addition the stabilisers were added, namely, 11.8 g (0.05 mol) of the above-mentioned adduct of 2 mol propylene carbonate and 1 mol hydrazine, with M=236, as well as 3.7 g Tinuvin 770 DF® (Ciba Speciality) and 5.2 g isobutanol.

This cross-linking agent had the following characteristic properties:

516.7 g (0.95 g equiv.) blocked NCO groups

| | |
|---|---|
| Solids content: | 75 wt. % |
| Blocked NCO content: | 7.7 wt. % |
| (Blocked) NCO equivalent: | 545 g |

Example 6

According to the Invention

The preparation of aqueous clear varnishes using the cross-linking agents from Examples 1 and 5 is described. The yellowing caused by overstoving is compared by means of these clear varnishes.

| Coating 1: | Cross-linking agent as in Example 1 525 g | Bayhydrol ® VP LS 2058* 850 g |
|---|---|---|
| Coating 2: | Cross-linking agent as in Example 5 545 g | Bayhydrol ® VP LS 2058* 850 g |

*Bayhydrol ® VP LS 2058 from Bayer AG is a PES-PAC dispersion containing OH groups, which is dispersed predominantly in water together with a little butyl glycol. The OH content of the supplied material is 2% and the OH equivalent is 850 g.

The clear varnishes were prepared by mixing together cross-linking agent and OH resin in the ratio of the equivalent weights (NCO:OH=1:1) by means of a glass rod, as described above. After ventilation for approximately 15 minutes, the coatings were workable.

Films of clear varnish (thickness of dry film: 40–50 μm) were produced on glass plates by means of a air-pressurised spray gun (nozzle 1.4 mm, spraying pressure 2.5 bar), ventilated for 3 minutes at room temperature and stoved for 30 minutes at 100° C. The b values (yellow values) were determined using the CieLab method. The films of clear varnish were then overstoved for 30 minutes at 160° C. and the b values were determined once again. The difference between these b values, that is, the Δb values, are a measure of the resistance of the coatings to overstoving.

|  | Coating 1 | Coating 2 |
|---|---|---|
| Δb values determined by the CieLab method between 30 min. 100° C. and 30 min. 160° C. | 2.1 | 0.7 |

It can be seen that coating 2, which contains the additionally stabilised cross-linking agent, has a Δb value of 0.7, which is lower than that of coating 1; under conditions of overstoving, this coating yellows to a significantly lesser extent than coating 1.

Example 7

According to the Invention

This example describes the preparation of a cross-linking agent according to the invention based on Desmodur®W and the formulation of an aqueous clear coating composition and its coating properties.

a) Cross-linking Agent

Starting ingredients:

| 246.0 g | (1.0 g equiv.) | of a partially trimerised polyisocyanate based on an 80% Desmodur ® W solution in butyl diglycol acetate and having an NCO content of 17.1% by weight[1] |
|---|---|---|
| 160.0 g | (1.0 g equiv.) | diethyl malonate (MDE) |
| 3.0 g | | Na methylate solution, 30% in methanol |
| 8.5 g | (0.1 g equiv.) | 3,3,5-trimethyl-5-aminomethylcyclohexylamine (IPDA) |
| 3.0 g | (0.1 g equiv.) | paraformaldehyde |
| 3.7 g | | Tinuvin ® 770 DF[2] |
| 7.5 g | | hydrazine adduct[3] |
| 78.5 g | | butyl glycol acetate (BDGA) |
| 39.3 g | | isobutanol (IB) |
| 39.3 g | | N-methylpyrrolidone (NMP) |
| 11.7 g | | dibutyl phosphate (DPP) |
| 601.0 g | (1.0 g equiv.) | blocked NCO groups |
| | calc. solids content: | approx. 65% |
| | viscosity at 23° C.: | approx. 9800 mPas |
| | pH value: | approx. 5.3 |
| | clear, almost colourless solution: | Hazen 60–80 |
| | calc. blocked NCO content: | 7.0% by weight |

[1]15.0 g equiv. Desmodur ® W =1965.0 g NCO content: 32.06%
5.25 g equiv. trimerisation with a 10% Triton B solution in n-butanol at 85–95° C.
9.75 g equiv. NCO groups = 1965.0 g NCO content: 20.8% (found)
BDGA (80%) = 491.3 g
9.75 g equiv. NCO groups = 2456.3 g NCO: 17.1% (found)
1.0 g equiv. partially trimerised Desmodur ® W = 246.0 g
[2]obtainable from Ciba Specialty
[3]This is the reaction product of 2 mol of propylene carbonate (102) and 1 mol of hydrazine hydrate (50), e.g. by refluxing these starting products in toluene and distilling off toluene and the hydration water a colourless oil with a molecular weight of 236 remains.

The trimerisation (isocyanurate formation) of Desmodur®W is carried out by the conventional steps: a vacuum is applied and dissolved $CO_2$ is removed; the mixture is heated to approx. 80° C. with stirring and the catalyst solution is added dropwise until the trimerisation reaction begins exothermally, and then the reaction is kept at 85–95° C. by the addition of catalyst solution at regular intervals—8–12 ml of the catalyst solution are consumed for the above reaction over a period of approx. 5 hours—when the required NCO content is reached the mixture is diluted with BDGA and the reaction thereby terminated.

Preparation: (Preparation of a Blocked Isocyanate)

For the blocking process the partially trimerised Desmodur®W is stirred with two thirds of the quantity of diethyl malonate and the mixture is preheated to approx. 50° C. The remaining third of the diethyl malonate is mixed with 3.2 g of an Na methylate solution to form a catalyst mixture. This catalyst mixture is introduced in portions, it being permissible for the temperature to rise to 70–75° C. When the addition of the catalyst is complete stirring is continued for a further 5 hours at 70° C. The mixture then still has an NCO content of 0.3–0.8%. It is diluted with BDGA and the remaining NCO groups are incorporated with IPDA. It is no longer possible to detect any content of NCO. At 50° C. the clear solution of paraformaldebyde, 0.3 g of a Na methylate solution and IB is added and the mixture is subsequently stirred for 2 hours at 50° C.

Then the solution of Tinuvin® 770 DF, the hydroazine adduct and NMP is added and subsequent stirring is carried out for 1 hour at 50° C. At the end DBP is added and stirring is carried out for 5 hours at 50° C. A storage-stable, non-gas-emitting ($CO_2$) solution of a malonic-ester-blocked polyisocyanate having the characteristics mentioned at the outset is obtained.

b) Clear coating formulation

Parts by weight

| 46.00 | (0.054 g equiv.) | Bayhydrol ® VP LS 2058, 42% in water, OH equivalent: 850 g, cf. Example 6 |
|---|---|---|
| 0.27 | | Byk 346 |
| 0.49 | | Byk 380 |
| 0.17 | (0.053 g equiv.) | cross-linking agent according to Example 7a |
| 21.17 | | water |
| 100.0 | | total, coating composition |

Coating Composition in %:

| binder: | approx. | 40.0 |
|---|---|---|
| water: | approx. | 49.0 |
| organic solvents: | approx. | 10.0 |
| additives: | approx. | 1.0 |
| | | 100.0 |

This coating composition is stable in storage for 5 days at 40° C.

Coating Data:

| NCO/OH ratio: | 1.0 |
|---|---|
| Outflow time (DIN 4 cup): | approx. 30 secs. |
| pH-value: | approx. 7.5 |

Preparation and Processing Details:

The components are dispersed in a dissolver in the abovementioned sequence and, as described in Example 4, sprayed onto plastic boards and dried for 30 mins. at 90° C./30 mins. at 100° C.

b) Coating Properties

| | |
|---|---|
| Solvent resistance after exposure for one minute to xylene/methoxypropyl acetate/ethyl acetate/acetone [0 = unchanged, 5 = coating has peeled off] | 30 mins. at 90° C. 0024 30 mins. at 100° C. 0002 |
| König pendulum hardness [in secs.] | 30 mins. at 90° C. 30 mins. at 100° C. 132    156 |
| Appearance of the film coating [visual assessment] | O.K. |

Example 8

Comparison

Duranate® MF-K (from Asahi/J) is an HDI trimer blocked with diethyl malonate. It contains toluene, ethyl acetate and n-butanol as the solvents.

In contrast to the cross-linking agents according to the invention of Examples 1 and 7 Duranate® MF-K cannot be formulated in an analogous manner to form aqueous coating compositions. Also, this cross-linking agent is not stable in storage, as was clear from the very vigorous evolution of gas ($CO_2$) at 40° C.

What is claimed is:

1. A blocked polyisocyanate cross-linking agent which is dissolved in a solvent or a solvent mixture and comprises the reaction product of a) 100 equivalent %, based on NCO groups, of an aliphatic and/or cycloaliphatic polyisocyanate, b) 80 to 95 equivalent % of a CH-acid ester blocking agent, c) 5 to 20 equivalent. %, based on $NH_2$ groups, of an aliphatic and/or cycloaliphatic diamine and d) 5 to 40 mole %, based on 100 equivalent % of blocked and diamine extended isocyanate groups, of formaldehyde in chemically incorporated form.

2. The blocked polyisocyanate cross-linking agent of claim 1 wherein said CH-acid ester blocking agent comprises diethyl malonate.

3. An aqueous coating composition or a solvent-containing coating composition containing the blocked polyisocyanate cross-linking agent of claim 1 and an organic polyhydroxyl compound.

* * * * *